US006865219B2

(12) United States Patent
Kim et al.

(10) Patent No.: US 6,865,219 B2
(45) Date of Patent: Mar. 8, 2005

(54) APPARATUS AND METHOD OF CIRCULAR GROUP-WISE PARALLEL INTERFERENCE CANCELLATION FOR MULTI-RATE DS-CDMA SYSTEM

(75) Inventors: Seong Rag Kim, Taejon (KR); In Kyeong Choi, Taejon (KR); Young Wha Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 805 days.

(21) Appl. No.: 09/872,276

(22) Filed: May 31, 2001

(65) Prior Publication Data

US 2002/0061053 A1 May 23, 2002

(30) Foreign Application Priority Data

Nov. 22, 2000 (KR) ........................................ 2000-69593

(51) Int. Cl.[7] .............................................. H04B 15/00
(52) U.S. Cl. ...................................... 375/148; 375/346
(58) Field of Search ................................ 375/148, 147, 375/136, 340, 341, 346, 320, 324, 285; 370/335, 342, 441

(56) References Cited

U.S. PATENT DOCUMENTS

| | | | | |
|---|---|---|---|---|
| 5,953,369 A | * | 9/1999 | Suzuki | 375/206 |
| 6,067,333 A | * | 5/2000 | Kim et al. | 375/346 |
| 6,473,415 B1 | * | 10/2002 | Kim et al. | 370/342 |
| 6,496,534 B1 | * | 12/2002 | Shimizu et al. | 375/148 |
| 6,553,058 B1 | * | 4/2003 | Naito | 375/148 |
| 6,661,835 B1 | * | 12/2003 | Sugimoto et al. | 375/148 |
| 6,728,324 B1 | * | 4/2004 | Shan et al. | 375/346 |
| 6,741,634 B1 | * | 5/2004 | Kim et al. | 375/144 |

FOREIGN PATENT DOCUMENTS

| | | |
|---|---|---|
| KR | 10-0248454 | 3/2000 |
| KR | 10-0255565 | 5/2000 |

OTHER PUBLICATIONS van Meeteren et al., "Groupwise Weighted Parallel Interference Cancellation for Asynchronous Multirate DS–CDMA," *IEEE Proceedings of VTC*, pp. 1820–1824, May 1999.

* cited by examiner

*Primary Examiner*—Stephen Chin
*Assistant Examiner*—Dung X Nguyen
(74) *Attorney, Agent, or Firm*—Seed IP Law Group PLLC

(57) ABSTRACT

An apparatus and method for performing circular groupwise parallel interference cancellation in a multi-rate DS-CDMA system that reduce the multiple access interference in a CDMA system are disclosed. The invention provide a method of grouping received signals, which improves the interference cancellation efficiency of the signal receiver. The method of the invention groups a plurality of signals according to the magnitude of signals, and sequentially performs interference cancellation with respect to the groups in order of the signal magnitude. The apparatus and method determine the signal rank by using both the power estimation value of the received signal of each finger and the soft bit decision value being the output value of the maximal ratio combiner, perform grouping of the fingers selected by a finger selector, and finally perform interference cancellation. The soft bit decision value is independent of channel, and has the bit information at the time of signal transmission. Accordingly, this soft bit decision value is employed along with the power estimation value of the received signal, to allow more accurate grouping of signals.

9 Claims, 3 Drawing Sheets

APPARATUS AND METHOD OF CIRCULAR GROUP-WISE PARALLEL INTERFERENCE CANCELLATION FOR MULTI-RATE DS-CDMA SYSTEM

TECHNICAL FIELD

The present invention relates to a code division multiple access (hereinafter referred to as CDMA) mobile communication system. More particularly, it relates to an apparatus and a method of circular group-wise parallel interference cancellation for reducing a multiple access interference of CDMA mobile communication system receiver.

BACKGROUND OF THE INVENTION

Conventionally, since a plurality of signals which are transmitted in the same frequency band by using a unique spread code from each terminal unit are mixed and then received in CDMA mobile communication system, a system performance becomes deteriorated by a multiple access interference generated when despreading a received signal. In order to reduce this multiple access interference of the CDMA mobile communication system, a group-wise interference cancellation method has been employed. There are two kinds of the group-wise interference cancellation methods, that is, GSIC (Group-wise Successive Interference Cancellation) method and GPIC (Group-wise Parallel Interference Cancellation) method.

The GSIC (Group-wise Successive Interference Cancellation) method groups a plurality of signals according to the signal power, sequentially selects the signals one by one in order of the magnitude of the signal power, and thus performs the interference cancellation. As the GPIC (Group-wise Parallel Interference Cancellation) method, GW-PIC (Group-wise Weighted Parallel Interference Cancellation) method for giving a weight value to every group has been employed.

The aforementioned group-wise interference cancellation method makes a signal group in consideration of either a power of a transmission signal or the data speed, or makes a signal group by using the received signal. In the first case for making a signal group in consideration of either the power of a transmission signal or the data speed, the signal rank and the signal group are previously determined when transmitting signals. However, in a multipath fading channel environment, although a signal is very intensive at the time of a signal transmission, the power of the signal may be very attenuated due to an influence of fading and multipath when receiving the signal. Therefore, if such a signal participates in an interference cancellation, it may increase the noise to deteriorate the system performance. In addition, if the signal grouping is made by using the maximal ratio combiner output of the received signal of each finger, grouping is performed for each detector.

A typical prior technique for overcoming the above problems of the aforementioned group-wise interference cancellation methods is disclosed in Korean Patent Registration No. 255565, entitled "multiple mode subtraction-type noise cancellation method and apparatus in multiple mode asynchronous multipath channel of CDMA system", filed by the applicant of this application, describing a multiple mode interference cancellation method in detail.

Such a multiple mode interference cancellation method groups a plurality of signals according to the power of the signal received at each finger, first selects a group having the greatest signal power, then sequentially selects a plurality of groups in the order of the magnitude of signal power, performs an interference cancellation by subtracting regeneration signals from the selected group, and performs an adding step in the next interference cancellation step. These steps are repeated for each interference cancellation step.

Since the above multiple mode interference cancellation method divides groups according to the power of the received signal of each finger, relatively accurate grouping can be achieved. However, in case of multiple rate transmission in which the bit length is different in each of signals, a signal with a high instantaneous bit energy has a higher reliability as compared to a signal received with a high instantaneous power. Therefore, considering only the power of the received signal causes a problem that makes the regeneration signal for subtraction inaccurate.

SUMMARY OF THE INVENTION

Accordingly, the present invention is directed to an apparatus and a method of a circular group-wise parallel interference cancellation for a multi-rate DS-CDMA system that substantially obviate one or more of the problems due to limitations and disadvantages of the related art.

It is an object of the present invention to provide an apparatus and a method for group-wise parallel interference cancellation for a multi-rate DS-CDMA system, which determine the signal rank by using both the output of a maximal ratio combiner of the received signal and the power estimation value of each finger, performs grouping of the fingers according to the determined signal rank, and perform a group-wise parallel interference cancellation.

To achieve these and other advantages and in accordance with the purpose of the present invention, as embodied and broadly described, an apparatus for performing circular group-wise parallel interference cancellation in CDMA system is provided that includes a plurality of detectors connected in parallel, each of the detectors including a plurality of fingers receiving signals, estimating the power of the received signal, outputting the estimated power, and demodulating the received signal on a corresponding path; and a maximal ratio combiner combining the received signal on each path demodulated by the fingers according to a maximal ratio combining method, and outputting soft bit decision value;

a rank decision part receiving the soft bit decision value of the maximal ratio combiner of each detector and the power estimation value of the received signal generated by each finger of each detector, and determining the rank of the received signal of each path; and a finger selector receiving a rank decision signal generated by the rank decision part, and outputting a signal for selecting a predetermined number of fingers, wherein the fingers selected by the finger selector generate and output base band signals of the received signal on the corresponding path, and the base band signals generated from the selected fingers are added to obtain a sum value of the base band signals, the sum value is subtracted from the received signal to perform the group-wise interference cancellation.

In another aspect, a method for performing group-wise parallel interference cancellation in CDMA system is provided, the system including a plurality of detectors connected in parallel, each of the detector including a plurality of fingers receiving signals, estimating the power of the received signal, outputting the estimated power, and demodulating the received signal on a corresponding path; and a maximal ratio combiner combining the received signal on each path demodulated by the fingers according to a maximal ratio combining method, and outputting soft bit decision value, the method includes the steps of:

(a) calculating the soft bit decision value of the maximal ratio combiner of each detector and the power estimation value of the received signal generated by each finger of each detector, and determining the rank of the received signal of each path according to the magnitude of the calculated values; and (b) selecting predetermined number of the fingers according to the rank determined in the step (a), wherein the fingers selected in said step (b) generate a base band signal of the received signal of the corresponding path and output the base band signal, and the base band signals generated by the selected fingers are added to obtain a sum value of the base band signals, and the sum value is subtracted from the received signal.

In accordance with still another aspect of the invention, a grouping method for performing cancellation interference in CDMA system is provided, the method including a plurality of detectors connected in parallel, each of the detector including a plurality of fingers receiving signals, estimating the power of the received signal, outputting the estimated power, and demodulating the received signal on a corresponding path; and a maximal ratio combiner combining the received signal on each path demodulated by the fingers according to a maximal ratio combining method, and outputting soft bit decision value, the method including the steps of:

a1) calculating a soft bit decision value of the maximal ratio combiner of each detector and a power estimation value of the received signal generated by each finger of the detector, and determining the rank of the received signal of each path; and b1) selecting fingers needed for the interference cancellation according to the rank determined in the step (a1), whereby the selected fingers are grouped to perform the interference cancellation.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The embodiments of the present invention will be explained with reference to the accompanying drawings, in which.

DETAILED DESCRIPTION OF THE INVENTION

Reference will now be made in detail to the preferred embodiments of the present invention, examples of which are illustrated in the accompanying drawings.

Figure 1:
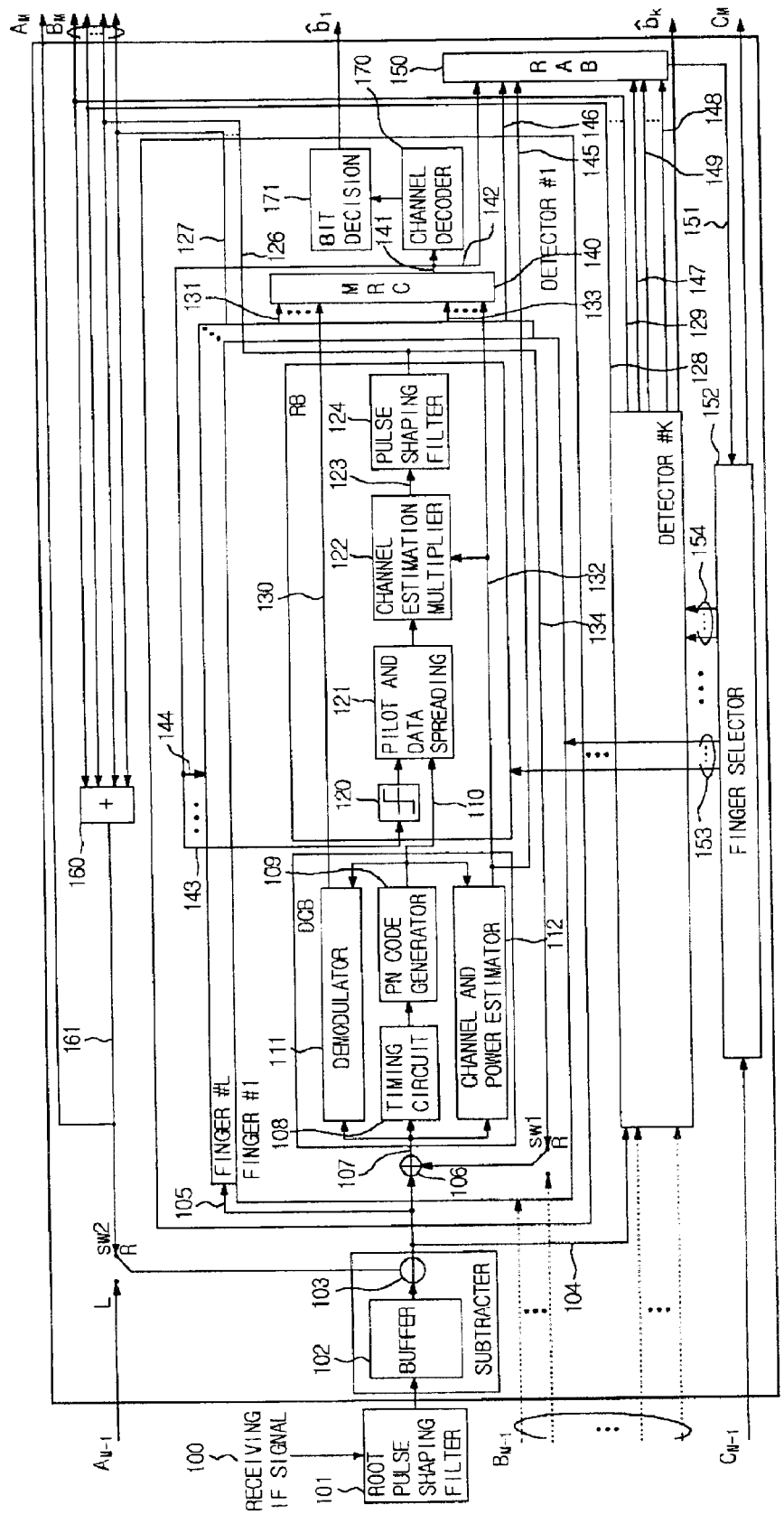
FIG. 1 is a block diagram illustrating a multi-rate CDMA system having a group-wise parallel interference cancellation apparatus according to the present invention.

FIG. 1 depicts CDMA system using a grouping method for the circular group-wise parallel interference cancellation of a multi-rate CDMA system according to the present invention.

Referring to FIG. 1, a received intermediate frequency (IF) signal 100 is generated via a receiving antenna, a carrier frequency demodulator and an analog-to-digital (A/D) converter, which are not shown in FIG. 1. This received IF signal 100 is converted to a base band signal via a root pulse shaping filter 101 which are the same as a root pulse shaping filter used in a transmission operation of each terminal unit, and is then stored in a buffer 102 inside of a subtracter. The base band signal stored in the buffer 102 is input to an adder 106 of each detector (#1, . . . , #K) through a path 104, and is input to each finger (#1, . . . , #L) of each detector through a path 105. Here, the finger of each detector is provided to detect L multipath signals of each user, and includes a despreading and channel estimation block (DCB) and a signal regeneration block (RB).

The despreading and channel estimation block (DCB) includes a timing circuit 108, a PN(pseudo noise) code generator 109, a demodulator 111, and a channel and power estimator 112.

The timing circuit 108 performs PN code acquisition and tracking operation by using a base band signal 107 generated from an adder 106. The PN code generator 109 generates a PN code 110 which is the same as the PN code used in a transmitted signal by using a synchronization information generated from the timing circuit 108. The demodulator 111 performs PN despreading and Walsh despreading with respect to the base band signal 107 by using the PN code 110 generated from the PN code generator 109. The channel and power estimator 112 estimates channel parameters such as amplitude, phase and power value.

A maximal ratio combiner (MRC) 140 generates a signal 141 which combines a plurality of signals 130, 131, 132, and 133 generated from L fingers according to a maximal ratio combining method. The maximal ratio combiner 140 is provided to combine L multipath signals of each user without missing one of the L multipath signals. The maximal ratio combiner 140 multiplies L multipath signals by a signal-to-noise (S/N) ratio corresponding to the L multipath signals, sums the obtained results of the multiplication process to obtains a sum value.

A rank block 150 receives a plurality of power values 145, 146, 148 and 149 estimated by the channel and power estimator 112 and a plurality of output signals 142 and 147 of the maximal ratio combiner 140, and determines the rank of the received signal of each finger. The power values 145, 146, 148 and 149 are positioned in the DCB (dispreading and channel estimation block) installed at each finger (#1, . . . , #L) of each detector (#1, . . . , #K). An output signal 151 of the rank block 150 is input to a finger selector 152, and the finger selector 152 transmits a plurality of signals 153 and 154 for selecting a predetermined number of fingers to each finger of each detector. When a finger inside of a detector is selected, a signal regeneration block (RB) inside of the finger is driven. If the finger is not selected, the signal regeneration block (RB) is not driven.

The signal regeneration block (RB) includes a hard decision part 120, a pilot and data spreading part 121, a channel estimation multiplier 122, and a pulse shaping filter 124. The hard decision part 120 determines a temporary bit by receiving a plurality of output signals 143 and 144 of the maximal ratio combiner 140. It determines a temporary bit as '1' when the input signal is not a negative number, and determines a temporary bit as '−1' when the input signal is a negative number. The pilot and data spreading part 121 within the a signal regeneration block (RB) of the selected finger performs Walsh spreading and PN spreading by using the output of the hard decision part 120 and the PN code 110 generated from the despreading channel estimation block (DCB). At this time, the Walsh spreading and PN spreading are the same as those used in signal transmission. The channel estimation multiplier 122 receives the spread signal of the pilot and data spreading part 121 and a channel estimation value 132, and regenerates a base band signal 123. The regenerated base band signal 123 is converted to a plurality of base band signals 126, 127, 128 and 129 through a pulse shaping filter 124 that has the same effect as the root pulse shaping filter used for signal transmission at the terminal unit connected in series with the root pulse shaping filter 101 shown in FIG. 1.

The base band signals 126, 127, 128 and 129 are all added by an adder 160. The adder 160 generates a sum signal 161 of the base band signals 126~129. A subtracter 103 subtracts the sum signal 161 from the base band signal stored in the buffer 102, and thus performs an interference cancellation.

Thus, a plurality of multipath signals having high power values 145, 146, 148 and 149 estimated by the above steps and having high soft bit decision value being output signals 142 and 147 of the maximal ratio combiner 140 are removed. Therefore, the influence of the removed multipath signals in the subsequent detection step on other signals is reduced.

After the interference cancellation step, if a first switch sw1 is connected to a position R, the shape-filtered base band signals 126, 127, 128 and 129 of the finger selected by the finger selector 152 are added all by the adder 106 through a feedback path 134, and a sum value of the base band signals 126~129 is input to a timing circuit 108. The finger selected by the finger selector 152 participates in subsequent noise cancellation step on the basis of the plurality of renewed estimation values 130, 131, 132 and 133. Therefore, as shown in FIG. 1, interference cancellations are repeated by a single unit.

A channel decoder 170 and a bit decision part 171 finally determine the transmission information by using a signal 141 after completing the interference cancellation step.

Figure 2:
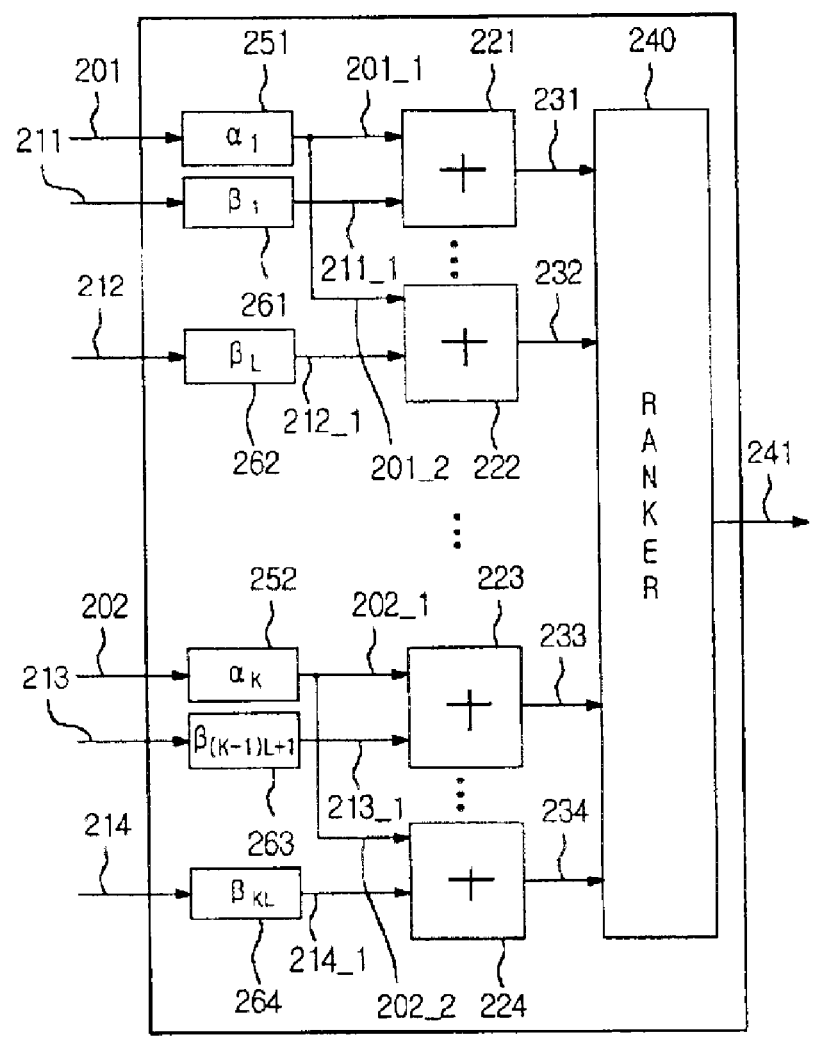
FIG. 2 is a block diagram illustrating a preferred embodiment of a rank block shown in FIG. 1.

FIG. 2 is a block diagram illustrating the structure of a rank block (RAB) 150 shown in FIG. 1.

Soft bit decision values being the output signals 142 and 146 of the maximal ratio combiner 140 of FIG. 1 are used as input signals 201 and 202 of a rank block (RAB) of FIG. 2. A plurality of power values 145, 146, 148 and 149 estimated by the channel and power estimator 112 positioned in the despreading and channel estimation block (DCB) inside of each finger (#1, . . . , #L) of each detector (#1, . . . , #K) of FIG. 1 are used as input signals 211, 212, 213 and 214 of a rank block(RAB) of FIG. 2. A weight value is given to the input signals 201 and 202 of the rank block through weight value endowing parts 251 and 252. The weight value is given to other input signals 211, 212, 213 and 214 through weight value endowing parts 261, 262, 263 and 264. Here, the above weight values of the weight value endowing parts 251, 252, 211, 212, 213 and 214 are adjusted according to the channel environment, and the rank method for signal grouping.

Each adder 221, 222, 223 and 224 inside of the rank block adds each weighted power estimation values 211_1, 212_1, 213_1 and 214_1 to the absolute values (or square values) of each weighted soft bit decision value 201_1, 201_2, 202_1 and 202_2. A rank part 240 determines the rank of the signals according to the magnitude of sum signals 231, 232, 233 and 234. That is, the signal having the highest magnitude is assigned with as the first rank, and a signal having the lowest magnitude is assigned with the last rank.

That is, assuming that an output value of the maximal ratio combiner of each detector is $a_j$(j=1, 2, . . . , K), the corresponding weight value for the output value is $\alpha_j$(j=1, 2, . . . , K), the power estimation value obtained at each finger is $b_i$(i=1, 2, . . . , KL), and a corresponding weight value for the power estimation value is $\beta_i$(i=1, 2, . . . , KL), output values 231, 232, 233 and 234 of the adders 221, 222, 223 and 224 become $\alpha_1|a_1|+\beta_1 b_1$, $\alpha_1|a_1|+\beta_L b_L$, $\alpha_K|a_K|+\beta_{(K-1)L+1}b_{(K-1)L+1}$, and $\alpha_K|a_K|+\beta_{KL}b_{KL}$. In the meantime, when selecting a square value, $(a_j)^2$ is used instead of $|a_j|$. By using these values, the rank part 240 determines the rank of signals, and then outputs the signals to the finger selector 152 shown in FIG. 1 through a path 241.

In case of a multiple data rate transmission, each signal has different bit length. Accordingly, with reference to a signal having the longest bit length, the rank part 240 averages the output values 231, 232, 233 and 234 of bits having shortest lengths, and determines the rank of the signals.

As described above, assuming that the weighted values of the maximal ratio combiners of all detectors are set to '0' (namely, $\alpha_j$=0 (j=1,2 , , , K)), the signal rank for signal grouping is determined by using only a power estimation value of each finger without considering the output value of the maximal ratio combiner. This is the same as a conventional multiple mode interference cancellation method.

In addition, assuming that the weight values for power estimation values obtained at each in finger are set to '0'(namely, $\alpha_j$=0 (j=1,2 , , , K), $\beta_i$=0 (i=1,2 , , , KL)), signal rank is not determined in the rank block. In this case, transmission power or transmission data rate information are transmitted to the finger selector so as to achieve a group-wise interference cancellation, thereby performing a signal grouping. This method is the same as conventional GSIC (Group-wise Successive Interference Cancellation) method.

In this manner, the structure of FIG. 2 may adjust the weight value of the weight value endowing part, various signal rank decision methods for signal grouping can be employed.

Figure 3:
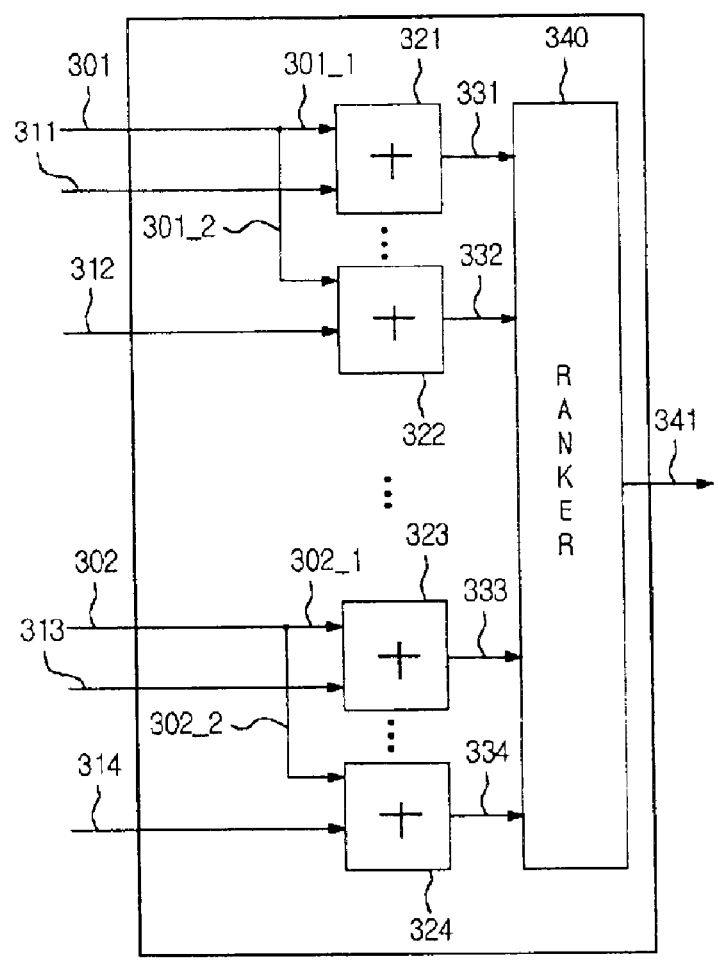
FIG. 3 is a block diagram illustrating another preferred embodiment of a rank block shown in FIG. 1.

FIG. 3 is a block diagram illustrating another preferred embodiment of the signal block of FIG. 2. When determining signal rank, the absolute values (or square values) of the output values (142 and 147 of FIG. 1 or 301 and 302 of FIG. 3) of the maximal ratio combiner are multiplied by the power estimation values (145, 146, 148 and 149 of FIG. 1 or 311, 312, 313, 314 of FIG. 3) of each finger by the multipliers 321, 322, 323 and 324. Then, a rank part 340 determines the signal rank. Other parts not particularly mentioned referring to FIG. 3. perform the same function as FIG. 2.

As described above, the apparatus and the method of performing group-wise parallel interference cancellation for multi-rate DS-CDMA system according to the present invention determine the signal rank by using both the power estimation value of the received signal of each finger of the detectors and the soft bit decision value being the output of the maximal ratio combiner, perform grouping of the fingers selected by the finger selector, and perform interference cancellation. The soft bit decision value being the output value of the maximal ratio combiner is channel independent, and has the bit information at the time of signal transmission. Accordingly, this soft bit decision value is employed along with the power estimation value of the received signal, thereby allowing more accurate grouping. In addition, by using the constructions shown in FIGS. 2 and 3, the weight value of the weight value endowing part is adjusted, the signal rank decision method for signal grouping can be applied to various other modifications.

Although representative embodiments of the present invention have been disclosed for illustrative purposes, those who are skilled in the art will appreciate that various modifications, additions and substitutions are possible without departing from the scope and spirit of the present invention as defined in the accompanying claims and the equivalents thereof.

What we claim:

1. An apparatus for performing circular group-wise parallel interference cancellation in CDMA system that includes a plurality of detectors connected in parallel, each of the detectors including a plurality of fingers receiving signals, estimating a power of the received signal, outputting the estimated power, and demodulating the received signal on a corresponding path; and a maximal ratio combiner combining the received signal on each path demodulated by the fingers according to a maximal ratio combining method, and outputting soft bit decision value, the apparatus comprising:

a rank decision part receiving the soft bit decision value of the maximal ratio combiner of each detector and the power estimation value of the received signal generated by each finger of each detector, and determining the rank of the received signal of each path; and a finger selector receiving a rank decision signal generated by the rank decision part, and outputting a signal for selecting a predetermined number of fingers, wherein the fingers selected by the finger selector generate and output base band signals of the received signal on the corresponding path, and the base band signals generated from the selected fingers are added to obtain a sum value of the base band signals, the sum value is subtracted from the received signal to perform the group-wise interference cancellation.

2. The apparatus according to claim 1, wherein the rank decision part comprises:

a weight value endowing part for endowing a weight values to both the output value of the maximal ratio combiner of each detector and the power estimation value of the received signal generated by each finger of the detector;

a plurality of adders for adding weighted absolute value (or square value) of the soft bit decision value of the maximal ratio combiner to the weighted power estimation value of the finger; and a rank part for determining the rank of the received signal on each path according to the magnitude of the output values of the plurality of adders.

3. The apparatus according to claim 1, wherein the rank decision part comprises:

a plurality of multipliers for multiplying the absolute value (or a square value) of the soft bit decision value of the maximal ratio combiner of each detector by the power estimation value of each finger; and a rank part for determining the rank of the received signal on each path according to the magnitude of the output values of the plurality of multipliers.

4. A method for performing group-wise parallel interference cancellation in CDMA system that includes a plurality of detectors connected in parallel, each of the detector including a plurality of fingers receiving signals, estimating a power of the received signal, outputting the estimated power, and demodulating the received signal on a corresponding path; and a maximal ratio combiner combining the received signal on each path demodulated by the fingers according to a maximal ratio combining method, and outputting soft bit decision value, the method comprising:

(a) calculating the soft bit decision value of the maximal ratio combiner of each detector and the power estimation value of the received signal generated by each finger of each detector, and determining the rank of the received signal of each path according to the magnitude of the calculated values; and (b) selecting predetermined number of the fingers according to the rank determined in the step (a), wherein the fingers selected in said step (b) generate a base band signal of the received signal of the corresponding path and output the base band signal, and the base band signals generated by the selected fingers are added to obtain a sum value of the base band signals, and the sum value is subtracted from the received signal.

5. The method according to claim 4, wherein the step (a) of determining the rank of the received signal of each path comprises:

(a') applying weight values to both the soft bit decision value of the maximal ratio combiner of each detector and the power estimation value of the received signal generated by each finger of the detector;

(b') adding weighted absolute value (or square value) of the soft bit decision value of the maximal ratio combiner and to the weighted power estimation value of the finger; and (c') determining the rank of the received signal on each path according to the magnitude of the result value of the step (b').

6. The method according to claim 4, wherein the step (a) of determining the rank of the received signal of each path comprises:

(i) multiplying an absolute value (or a square value) of the soft bit decision value of the maximal ratio combiner of each detector by the power estimation value of each finger; and (ii) determining the rank of the received signal on each path according to the magnitude of the value obtained in said step (i).

7. A grouping method for performing cancellation interference in CDMA system that includes a plurality of detectors connected in parallel, each of the detector including a plurality of fingers receiving signals, estimating a power of the received signal, outputting the estimated power, and demodulating the received signal on a corresponding path; and a maximal ratio combiner combining the received signal on each path demodulated by the fingers according to a maximal ratio combining method, and outputting soft bit decision value, the method comprising:

a1) calculating a soft bit decision value of the maximal ratio combiner of each detector and a power estimation value of the received signal generated by each finger of the detector, and determining the rank of the received signal of each path; and b1) selecting fingers needed for the interference cancellation according to the rank determined in the step (a1), whereby the selected fingers are grouped to perform the interference cancellation.

8. The grouping method according to claim 7, wherein the step (a1) of determining the rank of the received signal of each path comprises:
- (a') applying weight values to both the soft bit decision value of the maximal ratio combiner of each detector and the power estimation value of the received signal generated by each finger of each detector;
- (b') adding weighted absolute value (or square value) of the soft bit decision value of the maximal ratio combiner to the weighted power estimation value of the finger; and
- (c') determining the rank of the received signal on each path according to the magnitude of the result value of the step (b'), and grouping the signals according to the determined rank.

9. The grouping method according to claim 7, wherein the step (a1) of determining the rank of the received signal of each path comprises:
- (i') multiplying an absolute value (or a square value) of the soft bit decision value of a maximal ratio combiner of each detector by the power estimation value of each finger; and
- (ii') determining the rank of the received signal on each path according to the magnitude the value obtained in said step (i'), and grouping the signals according to the determined rank.

* * * * *